Nov. 15, 1966 B. BUCKLER 3,285,525

REELING CONTROL MECHANISM

Filed Nov. 23, 1964 2 Sheets-Sheet 1

Nov. 15, 1966 B. BUCKLER 3,285,525

REELING CONTROL MECHANISM

Filed Nov. 23, 1964 2 Sheets-Sheet 2

United States Patent Office 3,285,525

Patented Nov. 15, 1966

3,285,525

REELING CONTROL MECHANISM

Benjamin Buckler, Milton, Mass., assignor, by mesne assignments, to Keystone Mfg. Corp., Boston, Mass., a corporation of Massachusetts Filed Nov. 23, 1964, Ser. No. 412,902
13 Claims. (Cl. 242—55.12)

This invention relates to the winding and reeling art and more particularly to control mechanisms responsive to the transfer of material to or from reels.

In many reeling devices, for example, those employed in tape recorders and photographic devices for the transfer of a flexible record medium, either magnetic tape or photographic film, the reels are operated at high speeds or are disposed in relatively inaccessible locations or both, and it is desirable to provide a reel control signal to prevent the record medium from being entirely unwound from a reel or an excessive amount being loaded onto a reel. For example, where the material is to be rewound on the same reel again, if the end becomes detached, there is frequently great difficulty in readily reattaching material to the reel. The problems of controlling the reeling operation increase when a container or cartridge is employed which renders the amount of material remaining on the reel unobservable.

Accordingly, it is an object of this invention to provide a novel and improved reeling control mechanism.

Another object of the invention is to provide a novel and improved reeling control mechanism which is particularly useful where a reel housing is employed.

Another object of the invention is to provide novel and improved reeling control apparatus employing a sensor which engages the material on the reel during sensing but which operates to release the sensor in response to a predetermined reel condition so that the sensor does not interfere with the removal of an empty (or full) reel from the support unit.

Another object of the invention is to provide a reel drive interlock which prevents latched energization of the reel drive in the absence of material to be transferred in a reeling operation.

In accordance with the invention there is provided a reel control mechanism that includes a follower that is adapted to engage the surface of the record member of other material on a reel and a latch structure having two latching members which are engageable in latching position. Biasing means is connected between the follower and one of the latching members. Movement of the latching members into latching position acts against the biasing means to move the follower from a first position out of engagement with the reeled material to a biased position in engagement with the reeled material. A latch release element operates in response to movement of the follower when the amount of material on the reel reaches a predetermined condition and releases the latch and the biasing means so that the follower is moved away from the reel. An electric circuit may also be operated by the reeling control, to be closed, for example, when the latch is secured and opened upon latch release to provide a control signal indicating that a pre-established condition of material on the reel has been reached, which signal may be used to de-energize or reverse the reel drive.

In the preferred embodiment (a motion picture projector) the follower and both latch members are mounted for pivoting movement. A resilient biasing link coupled between the follower and one latch member operates, in response to rotation of the one latch member, to move the follower into a film holding container and bias it into engagement with the film. The rotated latch member is secured in rotated position by the other latch member so that the biasing link maintains the biasing force on the follower. An electric switch, coupled to the one latch member, is operated in an over-center manner to complete a reel drive circuit.

When the follower reaches a pre-established position, a latch release is operated which frees the latch and moves the bias link so that the follower is withdrawn from the container. The same operation opens the reel drive circuit, stopping rotation of the reel within the container and the film reel and container may then be removed from the projector apparatus.

Other features, objects, and advantages of the invention will be seen as the following description of preferred embodiments progresses, in conjunction with the drawings, in which.

Figure 4:
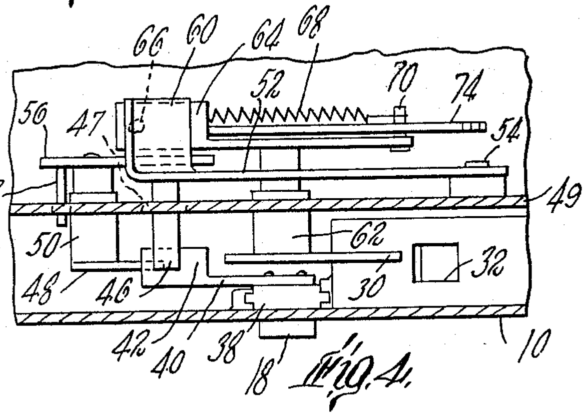
Figure 5:
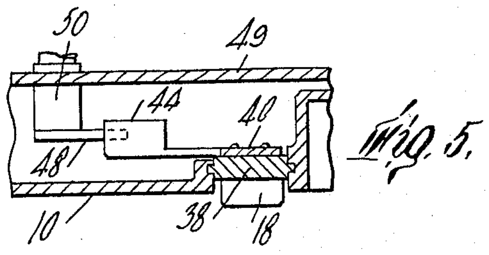
Figures 6, 7, 8, 9, 10, 11:
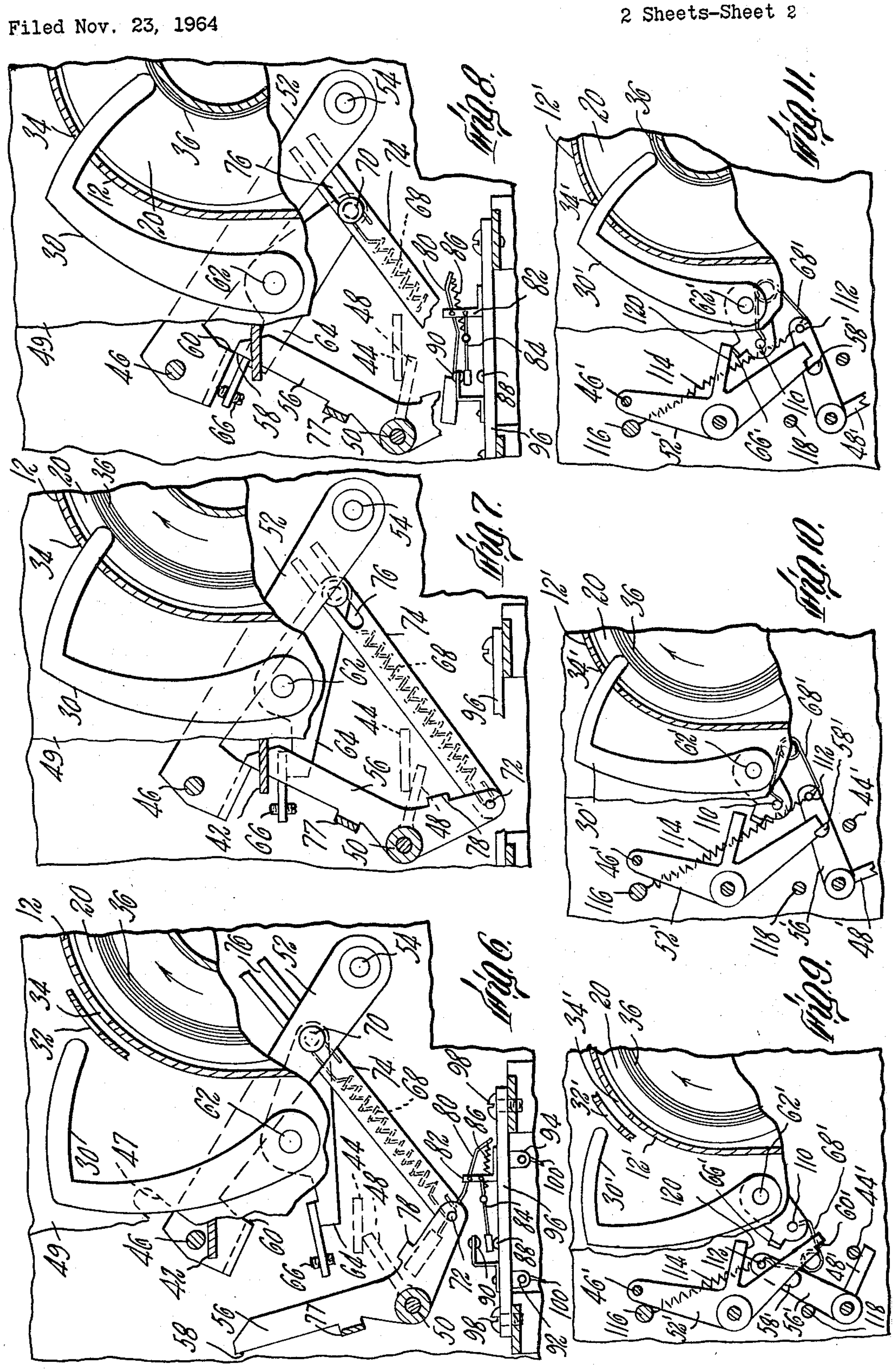

FIGS. 6–8 are diagrammatic views of the operation of the sensing mechanism shown in FIGS. 2–5 in a released and de-energized position, an initially latched position, and a position immediately prior to release of the reel follower, respectively; and FIGS. 9–11 are diagrammatic views of still another form of reeling control mechanism showing the mechanism in three positions corresponding to those shown in FIGS. 6–8.

Figure 1:
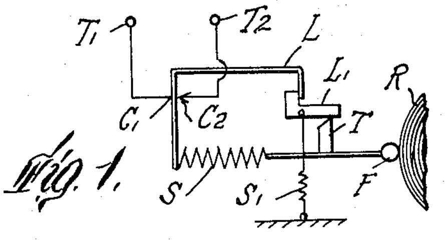
FIG. 1 is a diagram indicating a first form of reeling control mechanism.

Principles of the reel control mechanism of the invention are indicated in FIG. 1. With reference to that figure, a reel R of material has a follower F biased against it by spring S. The follower F is connected to one end of spring S and the opposite end of the spring is connected to a latch member L. A cooperating latch member L′ is biased in a downward (release) direction by auxiliary spring S′. Latch member L′, however, is held in raised position for engagement with cooperating latch member L by trip member T which moves with follower F. Also included is an electrical circuit having terminal $T_1$ connected to a first contact $C_1$ mounted on and carried by member L and terminal $T_2$ connected to a fixed contact $C_2$.

In operation, when latch members L and L′ are disengaged, spring S is released and contacts $C_1$ and $C_2$ are open. Movement of latch member L to the right, as viewed in FIG. 1, carries contact $C_1$ towards and into engagement with contact $C_2$, and that circuit is maintained when member L is latched by member L′. At that time, spring S is under compression and biases the follower F into engagement with the reel R. As the material on reel R increases, the follower F moves to the left, carrying trip T and further compressing spring S until trip T moves out under latch member L′ and allows the auxiliary spring S′ to pull member L′ downwardly from member L so that the compressed spring S pushes latch member L rapidly to the left, opening contacts $C_1$ and $C_2$ to de-energize the reel drive, for example. The momentum of latch member L also withdraws follower F from the reel R.

Figure 2:
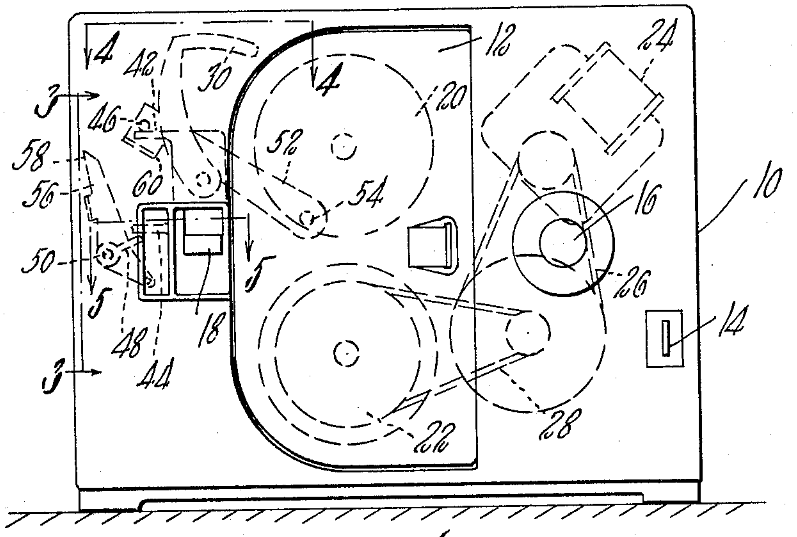
FIG. 2 is a front elevational view of a motion picture projector that incorporates a second form of reeling control mechanism.
Figure 3:
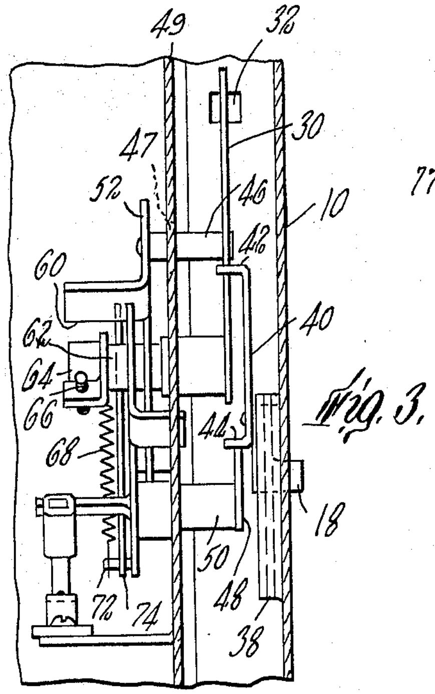
FIGS. 3–5 are sectional views taken along the lines 3—3, 4—4, and 5—5, respectively, of FIG. 1.

Details of a reeling control mechanism employed in a motion picture projector will be understood with reference to FIGS. 2–8. In FIG. 2 the projector includes a case 10 having a compartment for receiving a film container 12. Controls mounted on the case include a framing lever 14, a focusing knob 16, and a start switch 18. Additional details of the projector may be had with reference to patent application Serial No. 412,903, filed concurrently herewith in my name and entitled "Data Transducer." Two reels 20, 22 are disposed in container 12, and the lower reel 22 is connected to drive motor 24 through drive belts 26 and 28 and cooperating pulleys.

Start button 18 operates a control mechanism to move a reel follower member 30 (which is L-shaped in configuration) through apertures 32, 34 in the compartment wall and the container wall, respectively, into engagement with the film 36. The start button is mounted in slide 38, as indicated in FIGS. 4 and 5, for vertical movement. Secured to the rear of the slide element is an operating member 40 which has an upper projection 42 and a lower projection 44. Upper projection 42 is adapted to engage pin 46 which extends through slot 47 in support wall 49, while lower projection 44 engages pivot arm 48 mounted for rotation on shaft structure 50. Pin 46 is a portion of latch member 52 mounted for pivoting about axis pin 54, while a second latch member 56 is mounted on shaft 50 and rotates with arm 48 into a position so that its upper end (latch surface) 58 engages latch surface 60 of member 52 and is secured thereby.

As best shown in FIG. 6, the reel follower 30 is mounted for rotation about shaft axis 62. Secured to and rotating with follower 30 is a latch release arm 64 which carries an adjustable (threaded) latch release element 66. This latch release arm 64 is connected at its end opposite the latch release element 66 to a spring 68, the end of which is secured on pin 70. The other end of spring 68 is secured on pin 72 mounted on latch element 56. A guide element 74 is mounted on pin 72 and has a slot 76 in which pin 70 is received.

Latch member 56 has two tabs 77, 78, tab 77 cooperating with a slot in wall 49 to limit rotation of latch member 56 and tab 78 engaging an electrical switch operator member 80 which is mounted for pivoting movement on bracket 82. Operator member 80 is coupled to an over-center type of contact arm 84 by spring 86. Contact arm 84 is also mounted on bracket 82 and engages either first fixed contact 88 or second contact 90. Contact 90 is connected to terminal 92, while switch arm 84 is connected to terminal 94. The switch structure is mounted on an insulator member 96 and is secured by bolts 98 to the framework of the projector. Terminals 92 and 94 are connected to the drive motor 24 by conductors 100.

In operation, when control member 18 is moved downwardly, the lever arm 48 is rotated in a clockwise direction, carrying the latch member 56 in the same direction to ride underneath the latch surface 60 and be engaged and held thereby. This operation also tensions spring 68 and the follower 30 is moved in the clockwise direction. However, the follower 30 passes through apertures 32, 34 and engages the film F on reel 20 in the upper position in the container 12 so that further rotation of follower 30 is prevented and spring 68 remains under tension, but latch release element 66 does not engage latch member 52. This is the position shown in FIG. 7.

Also in this position tab 78, which cooperates with the switch actuating member 80, has been moved downwardly so that the switch is in the position shown in FIG. 8, that is, switch arm 84 engages contact 90 and completes a circuit to energize drive motor 24 and operate the intermittent and continuous drive units of the projector. This operation unreels the film from reel 20 towards the condition shown in FIG. 8. As the follower 30 moves in a clockwise direction, latch release element 66 moves upwardly until it engages the latch member 52 adjacent surface 60 and raises that latch member so that the latch surfaces 58 and 60 are disengaged. The tensioned spring 68 then pulls the latch member 56 in the counterclockwise direction, releasing the spring tension, and the force of gravity rotates the follower 30 out of the film compartment and it returns to the position of FIG. 6. This operation also releases switch operator 80 to open the circuit between arm 84 and contact 90 so that the drive motor 24 is de-energized, stopping the reeling operation.

It will be noted that this operation occurs automatically when the follower has reached a predetermined position with respect to the reel. This position may be selected with precision through adjustment of the latch release element 66. Also, the reel control mechanism operates in both the projection and rewind positions of the film container 12, the drive motor 24 being energized by the depression of the start button 18 and being de-energized when substantially all the film has been wound off of the reel that is in the upper position. At that time, the projector is automatically de-energized and the film container 12 may be removed without interference from the follower 30. The drive motor 24 may be de-energized and the follower 30 withdrawn at any time, merely by raising start button 18 which lifts tab 42 against pin 46 secured to latch member 52. The upward movement of that latch member releases the latch condition and the mechanism returns to the position shown in FIG. 6.

Another arrangement of a reeling control mechanism is indicated in FIGS. 9–11. The positions of that mechanism correspond to the showings in FIGS. 6–8, respectively. In this arrangement a similar type of follower 30′ is employed which is mounted for pivoting movement on axis 62′. The latch structure includes latch member 56′ which has a latch pin 58′ and cooperating latch member 52′ which has a latch surface 60′. Latch member 52′ tends to rotate in the clockwise direction under the influence of gravity or a suitable spring, for example, but is restrained by pin 58′. An over-center type of spring 68′ couples the follower structure 30′ to latch member 56′ via pins 110 and 112. An auxiliary spring 114 connected between pin 112 and fixed pin 116 normally biases the latch member 56′ in the counterclockwise direction against post 118, as shown in FIG. 9. Integral with latch member 56′ is arm 48′ which is juxtaposed with operator member 44′. A release pin 46′ is mounted on latch member 52. Electrical switch structure (not shown) is similar to the switch structure of the embodiment shown in FIGS. 2–8, being in a first condition with the control mechanism in the position shown in FIG. 9 and in a second condition when the latch members 52′ and 56′ are engaged.

In operation pin 44′ is moved downwardly to rotate latch member 56′ in the clockwise direction so that latch pin 58′ moves into latch recess 60′. During this rotation, spring 68′ is moved from a position tending to bias both follower 30′ and latch member 56′ in the counterclockwise direction to an "over-center" position in which it biases follower 30′ in the clockwise direction so that it moves through apertures 32′, 34′ to engage the film (as shown in FIG. 10). Spring 68′ tends to move latch member 56′ in the clockwise direction also, but this tendency is overbalanced by spring 114 which maintains two latch members in engagement. As the film is withdrawn from the reel, the follower moves in a clockwise direction, carrying latch release member 66′ upward until it engages the release surface 120 of latch member 52′, as indicated in FIG. 11. In that position, after the latch elements 58′, 60′ are disengaged, spring 114 pulls latch member 56′ in the counterclockwise direction and moves spring 68′ past its center position so that it acts against follower 30′ to withdraw it from the film container 12′.

In any of the arrangements it will be noted that the latch members will be secured only if sufficient material is disposed on a properly positioned reel. In the absence of such material (for example, the absence of the film container 12), the mechanism will not be latched and will return to its initial position as soon as the start button 18 is released. Thus, the reel drive is advantageously interlocked with the material to be reeled.

While preferred embodiments of the invention have been shown and described, modifications of the disclosed embodiments will be apparent to those skilled in the art. Therefore, it is not intended that the invention be limited to the disclosed embodiments or to details thereof, and departures may be made therefrom within the spirit and scope of the invention as defined in the claims.

What is claimed is:

1. A reeling control mechanism comprising means for supporting a reel for rotation,
 a follower mounted for movement towards and away from said reel,
 a latch structure including first and second latch members adapted to be engaged in latching relation,
 biasing means coupled between said latch structure and said follower for biasing said follower into engagement with material on said reel when said latch members are engaged,
 and latch release means operative in response to a predetermined position of said follower to release said latch members from one another and concurrently release the biasing force applied by said biasing means to said follower so that said follower moves out of contact with material on said reel.

2. The mechanism as claimed in claim 1 and further including reel rotating control means operated by said latch structure between a first condition preventing rotation of said reel when said latch members are disengaged, and a second condition permitting rotation of said reel when said latch members are engaged in latching relation.

3. A reeling control mechanism comprising a reel, means for driving said reel in rotation, a sensor adapted to sense the amount of material on said reel, a latch structure movable between a released position and an engaged position, means responsive to said latch structure for placing said sensor in condition for sensing the amount of material on said reel, means coupled to said reel driving means for enabling rotation of said reel when said latch structure is in engaged position, latch release means for releasing said latch structure and said reel drive enabling means in response to the sensing of a predetermined amount of material on said reel, and reel rotating control means operated by said latch structure between a first condition preventing rotation of said reel when said latch members are disengaged and a second condition permitting rotation of said reel when said latch members are engaged in latching relation.

4. The apparatus as claimed in claim 3 and further including electric circuit control means for completing an electric circuit to drive said reel when said latch members are in latching condition and for opening said electric circuit upon release of said latching members.

5. In motion picture apparatus a reeling control mechanism comprising a follower mounted for movement between a first position out of engagement with film on a reel and a second position in engagement with film on said reel,
 a latching mechanism including two latch members movable between a first unlatched position and a second latched position,
 a control member for moving one of said latching members to engage cooperating surfaces of said latching members in latching condition,
 biasing means coupled between one of said latching members and said follower acting to move said follower into engagement with film on said reel when said latching members are in latching engagement,
 and means carried by said follower for releasing said latch mechanism when said follower reaches a predetermined position as a function of the quantity of film on said reel.

6. The mechanism as claimed in claim 5 and further including reel rotating control means operated by said latch structure between a first condition preventing rotation of said reel when said latch members are disengaged and a second condition permitting rotation of said reel when said latch members are engaged in latching relation.

7. Motion picture apparatus comprising a housing,
 means on said housing for supporting a reel of motion picture film,
 a film follower supported on said housing and movable between a first position out of engagement with film on said reel and a second position in engagement with said film,
 control means for moving said film follower into engagement with said film,
 a latch structure movable in response to said control means between a disengaged position and an engaged position,
 biasing means coupled to said follower for urging said follower against said film when said latch structure is in engaged position,
 first latch release means responsive to said follower for releasing said latch structure in response to the sensing of a predetermined amount of film on said reel by said follower, and
 second latch release means responsive to said control means to release said latch structure independently of the position of said film follower.

8. The apparatus as claimed in claim 7 and further including means to adjust the position of said first latch release means relative to said follower for varying the amount of film necessary to cause said latch structure to be released by said first latch release means.

9. The apparatus as claimed in claim 7 and further including a motor for driving said reel, and
 means operative in response to the positioning of said latch structure in said engaged position to energize said drive motor and in response to the movement of said latch structure from said engaged position to said disengaged position to de-energize said drive motor.

10. A motion picture projector comprising a housing,
 a light source and a lens unit defining a light path,
 spindle means on said housing for supporting a reel of motion picture film,
 intermittent drive means for advancing film through said light path,
 a drive motor for operating said intermittent drive means,
 a film follower supported on said housing and movable between a first position out of engagement with said film on said reel and a second position in engagement with said film,
 control means for moving said film follower into engagement with said film,
 a latch structure movable in response to said control means from a disengaged position to an engaged position,
 means operative in response to the positioning of said latch structure in said engaged position to energize said drive motor and in response to the movement of said latch structure from said engaged position to said disengaged position to deenergize said drive motor,
 first latch release means responsive to said follower for releasing said latch structure in response to the sensing of a predetermined amount of film on said reel by said follower, and
 second latch release means responsive to said control means to release said latch structure independently of the position of said film follower.

11. The projector as claimed in claim 10 and further including biasing means coupled to said follower for biasing said follower against said film when said latch structure is in engaged position and for biasing said follower away from said film when said latch structure is in disengaged position.

12. The projector as claimed in claim 10 and further including means to adjust the position of said first latch release means relative to said follower for varying the amount of film necessary to actuate said first latch release means to release said latch structure.

13. A motion picture projector comprising a housing,
a compartment in said housing for receiving a magazine unit adapted to contain a reel of film,
a film follower mounted in said housing movable into said compartment for engagement with film in said magazine when said magazine is housed in said compartment,
a film drive motor,
means for coupling film in said magazine to said drive motor,
control means for moving said film follower into said compartment and said magazine for engagement with film on said magazine,
a latch structure movable in response to said control means between a disengaged position and an engaged position,
biasing means coupled to said film follower for biasing said follower against film in said magazine when said latch structure is in said engaged position and for biasing said follower away from said magazine when said latch structure is in said disengaged position,
means responsive to the movement of said latch structure to said engaged position to energize said drive motor to drive film through said magazine, and
latch release means responsive to said follower for releasing said latch structure in response to the sensing by said follower of a predetermined amount of film on the reel in said magazine to de-energize said motor and withdraw said follower from said magazine.

References Cited by the Examiner

UNITED STATES PATENTS

| | | | |
|---|---|---|---|
| 3,026,057 | 3/1962 | Horimura | 242—55.12 |
| 3,115,314 | 12/1963 | Manley et al. | 242—55.12 |
| 3,120,356 | 2/1964 | Zahner | 242—55.12 |

FRANK J. COHEN, *Primary Examiner.*

LEONARD D. CHRISTIAN, *Examiner.*